United States Patent
Raghavan et al.

(10) Patent No.: US 11,356,164 B2
(45) Date of Patent: Jun. 7, 2022

(54) TECHNIQUES FOR COMMUNICATING USING A MULTI-DIRECTIONAL BEAM IN MILLIMETER WAVE WIRELESS COMMUNICATIONS

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Raghu Narayan Challa, San Diego, CA (US); Ruhua He, San Diego, CA (US); Mihir Vijay Laghate, San Diego, CA (US); Farhad Meshkati, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/109,058

(22) Filed: Dec. 1, 2020

(65) Prior Publication Data
US 2021/0167834 A1    Jun. 3, 2021

Related U.S. Application Data

(60) Provisional application No. 62/943,057, filed on Dec. 3, 2019.

(51) Int. Cl.
*H04W 16/28* (2009.01)
*H04B 7/06* (2006.01)
(Continued)

(52) U.S. Cl.
CPC ......... *H04B 7/0634* (2013.01); *H04B 7/0617* (2013.01); *H04B 17/318* (2015.01); *H04L 5/0048* (2013.01); *H04W 16/28* (2013.01)

(58) Field of Classification Search
CPC .. H04B 7/0617; H04B 7/024; H04B 7/18513; H04B 7/0417; H04B 7/0452;
(Continued)

(56) References Cited

U.S. PATENT DOCUMENTS

| | | | |
|---|---|---|---|
| 2011/0142154 A1* | 6/2011 | Kyeong | H04B 7/088 375/267 |
| 2018/0227094 A1* | 8/2018 | Liu | H04L 5/0094 |
| 2020/0204243 A1* | 6/2020 | Liu | H04W 24/10 |

FOREIGN PATENT DOCUMENTS

WO    2018141204 A1    8/2018

OTHER PUBLICATIONS

LG ELECTRONICS: "Discussions on Full TX Power Uplink Transmission", 3GPP TSG RAN WG1 #96, 3GPP Draft; R1-1902093_FULL_POW_UL_TX_V2_CLEAN, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), 4 Pages, XP051599788, Retrieved from the Internet: URL: http://www.3gpp.org/ftp/tsg%5Fran/WG1%5FRL1/TSGR1%5F96/Docs/R1%2D1902093%2Ezip [retrieved on Feb. 16, 2019; p. 1 and 3.

(Continued)

*Primary Examiner* — Eva Y Puente
(74) *Attorney, Agent, or Firm* — Dalei Dong; Arent Fox LLP

(57) ABSTRACT

Some aspects described herein relate to reporting, to a node, an indication related to a capability to generate antenna weights for a multi-beam, receiving, from the node in response to the indication, a number of reference signals, and generating, based at least in part on the number of (Continued)

reference signals received from the base stations, multiple antenna weights to use in communicating with the base station.

26 Claims, 6 Drawing Sheets

(51) Int. Cl.
*H04B 17/318* (2015.01)
*H04L 5/00* (2006.01)

(58) Field of Classification Search
CPC ........................ H04B 7/18515; H04B 7/18519; H04B 7/195; H04B 10/00; H04B 10/11; H04B 10/118; H04B 10/25; H04B 10/2575; H01L 2924/00014; H01L 2924/013; H01L 2224/056; H01L 2224/05624; H01L 2224/05647; H01L 2224/05666; H01L 2224/05684; H01L 2224/13111; H01L 2224/13139; H01L 2224/13147; H04W 16/28; H04W 4/46; H04W 16/14; H04W 24/10; H04W 28/0236; H04W 4/021; H04W 4/022; H04W 4/023; H04W 4/40; H04W 72/0433; H04W 72/046; H04W 84/12; H04W 88/10
USPC .......................................................... 375/267
See application file for complete search history.

(56) References Cited

OTHER PUBLICATIONS

Partial International Search Report—PCT/US2020/062862—ISA/EPO—dated Mar. 5, 2021.
Qualcomm Incorporated: "CLI Measurements UE Capabilities", 3GPP Draft, 3GPP TSG-RAN2 Meeting #107-Bis, R2-1913392_CLI Capability-V2, 3rd Generation Partnership Project (3GPP), Mobile Competence Centre; 650, Route Des Lucioles; F-06921 Sophia-Antipolis Cedex; France, vol. RAN WG2, No. Chongqing, China; Oct. 14, 2019-Oct. 18, 2019, Oct. 4, 2019 (Oct. 4, 2019), XP051804971, 3 Pages, Retrieved from the Internet: URL: https://ftp.3gpp.org/tsg_ran/WG2_RL2/TSGR2_107bis/Docs/R2-1913392.zip R2-1913392 CLI capability-v2.docx, [retrieved Oct. 4, 2019; para 2 and 3.

* cited by examiner

TECHNIQUES FOR COMMUNICATING USING A MULTI-DIRECTIONAL BEAM IN MILLIMETER WAVE WIRELESS COMMUNICATIONS

CLAIM OF PRIORITY UNDER 35 U.S.C. § 119

The present application for patent claims priority to Provisional Patent Application No. 62/943,057, entitled "TECHNIQUES FOR COMMUNICATING USING MULTIPLE BEAMS IN MILLIMETER WAVE WIRELESS COMMUNICATIONS" filed Dec. 3, 2019, which is assigned to the assignee hereof and hereby expressly incorporated by reference herein for all purposes.

FIELD OF THE DISCLOSURE

Aspects of the present disclosure relate generally to wireless communication systems, and more particularly, to communicating using multiple beams.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, nodes communicating with one another can beamform communications to transmit signals in certain spatial directions and/or receive signals in certain spatial directions to improve hearability and/or quality of the communications. For example, the nodes can apply a beamforming matrix to apply weighted power to antenna resources to achieve the spatial direction for transmitting and/or receiving signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes reporting, to a base station, an indication related to a capability to generate antenna weights for a multi-beam, receiving, from the base station in response to the indication, a number of reference signals, wherein the number of reference signals are contiguous or non-contiguous in time, and generating, based at least in part on the number of reference signals received from the base stations, multiple antenna weights to use in communicating with the base station.

One or more of the above examples can further include wherein the capability includes a capability for estimating relative phases across antenna elements in generating the multiple antenna weights.

One or more of the above examples can further include wherein the capability includes a capability for estimating a signal strength or amplitude or quality in generating the multiple antenna weights.

One or more of the above examples can further include wherein reporting the indication comprises a dynamic reporting based on a state or one or more determined performance metrics.

One or more of the above examples can further include wherein the one or more determined performance metrics include at least one of a processing power for generating the multiple antenna weights, a power for operating a transceiver in generating the multiple antenna weights, a thermal measurement, a beamforming architecture, a bus latency, a memory overhead, or a performance improvement metric.

One or more of the above examples can further include wherein reporting the indication comprises a static reporting, a semi-static reporting, or a dynamic reporting.

One or more of the above examples can further include wherein the indication includes a first indication of the capability to generate multiple antenna weights and a second indication of a number of antenna elements in an active antenna subarray.

One or more of the above examples can further include wherein the indication includes the number of reference signals requested from the base station.

One or more of the above examples can further include receiving, from the base station, an indication of the number of reference signals allocated by the base station.

One or more of the above examples can further include communicating with the base station using the multi-beam generated from the multiple antenna weights.

In another example, a method of wireless communication is provided that includes receiving, from a user equipment (UE), an indication related to at least one of a capability to generate antenna weights for a multi-beam or a number of antenna elements in an active antenna subarray, determining, based at least in part on the indication, a number of reference signals to allocate to the UE for antenna weight generation for multi-beam communications, wherein the number of reference signals are contiguous or non-contiguous in time, and transmitting, to the UE, the number of reference signals to facilitate antenna weight generation to use in multi-beam communications with the base station.

One or more of the above examples can further include wherein the capability includes a first capability for using relative phase estimation across antenna elements in generating the multiple antenna weights, and wherein determining the number of reference signals comprises determining a lesser number of reference signals for the first capability than for a second capability for using a signal strength or amplitude or quality estimation in generating the multiple antenna weights.

One or more of the above examples can further include wherein the capability includes a first capability for using a signal strength or amplitude or quality estimation in generating multiple antenna weights, and wherein determining the number of reference signals comprises determining a greater number of reference signals for the first capability than for a second capability for using phase estimation in generating the multiple antenna weights.

One or more of the above examples can further include wherein the indication includes a first indication of the capability to generate multiple antenna weights and a second indication of the number of antenna elements in the active antenna subarray.

One or more of the above examples can further include wherein the indication includes a requested number of reference signals requested by the UE, and wherein determining the number of reference signals is based at least in part on the requested number of reference signals.

One or more of the above examples can further include transmitting, to the UE, an indication of the number of reference signals.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for wireless communication is provided including a transceiver, a memory configured to store instructions, and one or more processors communicatively coupled with the transceiver and the memory. The one or more processors are configured to report, to a base station, an indication related to a capability to generate antenna weights for multi-beam communications, receive, from the base station in response to the indication, a number of reference signals, wherein the number of reference signals are contiguous or non-contiguous in time, and generate, based at least in part on the number of reference signals received from the base station, multiple antenna weights to use in communicating with the base station.

One or more of the above examples can further include wherein the capability includes a capability for estimating relative phases across antenna elements in generating the multiple antenna weights.

One or more of the above examples can further include wherein the capability includes a capability for estimating a signal strength or amplitude or quality in generating the multiple antenna weights.

One or more of the above examples can further include wherein the one or more processors are configured to report the indication as a dynamic reporting based on a state or one or more determined performance metrics.

One or more of the above examples can further include wherein the one or more determined performance metrics include at least one of a processing power for generating the multiple antenna weights, a power for operating a transceiver in generating the multiple antenna weights, a thermal measurement, a beamforming architecture, a bus latency, a memory overhead, or a performance improvement metric.

One or more of the above examples can further include wherein the one or more processors are configured to report the indication as a static reporting, a semi-static reporting, or a dynamic reporting.

One or more of the above examples can further include wherein the indication includes a first indication of the capability to generate multiple antenna weights and a second indication of a number of antenna elements in an active antenna subarray.

One or more of the above examples can further include wherein the indication includes the number of reference signals requested from the base station.

One or more of the above examples can further include wherein the one or more processors are further configured to receive, from the base station, an indication of the number of reference signals allocated by the base station.

One or more of the above examples can further include wherein the one or more processors are further configured to communicate with the base station using the multi-beam generated from the multiple antenna weights.

In another example, an apparatus for wireless communication is provided that includes a transceiver, a memory configured to store instructions, and one or more processors communicatively coupled with the transceiver and the memory. The one or more processors are configured to receive, from a UE, an indication related to at least one of a capability to generate antenna weights for multi-beam communications or a number of antenna elements in an active antenna subarray that can be used for the multi-beam communications, determine, based at least in part on the indication, a number of reference signals to allocate to the UE for antenna weight generation for the multi-beam communications, wherein the number of reference signals are contiguous or non-contiguous in time, and transmit, to the UE, the number of reference signals to facilitate antenna weight generation to use in the multi-beam communications.

One or more of the above examples can further include wherein the capability includes a first capability for using relative phase estimation across antenna elements in generating the multiple antenna weights, and wherein the one or more processors are configured to determine the number of reference signals as a lesser number of reference signals for the first capability than for a second capability for using a signal strength or amplitude or quality estimation in generating the multiple antenna weights.

One or more of the above examples can further include wherein the capability includes a first capability for using a signal strength or amplitude or quality estimation in generating multiple antenna weights, and wherein the one or more processors are configured to determine the number of reference signals as a greater number of reference signals for the first capability than for a second capability for using phase estimation in generating the multiple antenna weights.

One or more of the above examples can further include wherein the indication includes a first indication of the capability to generate multiple antenna weights and a second indication of the number of antenna elements in the active antenna subarray.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
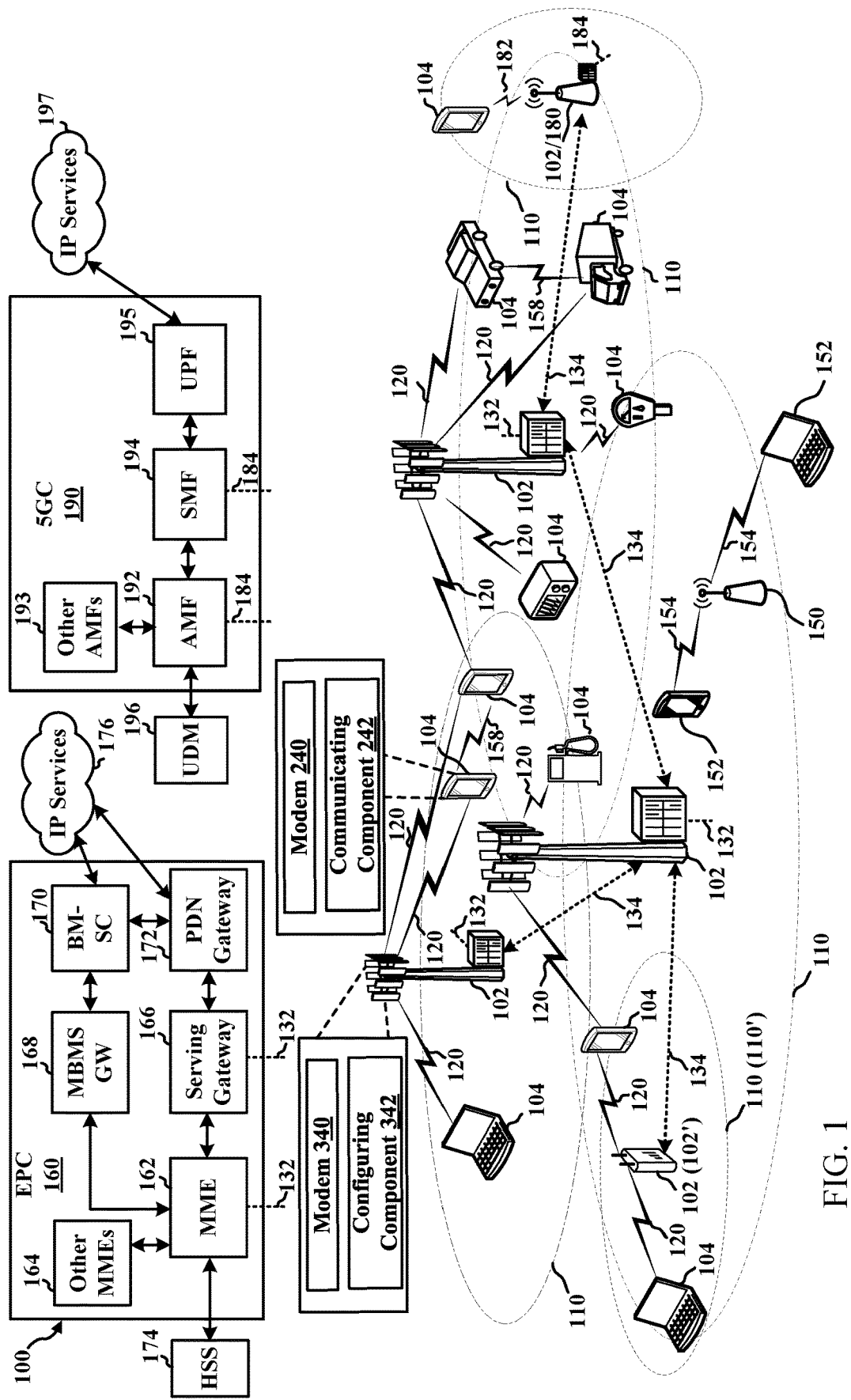
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using multi-directional beams in communications between nodes of a wireless network. In some wireless communication technologies, such as fifth generation (5G) new radio (NR), nodes can use directional beamforming to steer beams via clusters in a channel. For example, clusters can be defined as objects in the wireless channel environment that lead to reflection or diffraction of energy from one node to the other node (e.g., the base station to the user equipment or vice versa). In some cases, the diffraction may be temporary (e.g., caused by diffraction of energy around an object's corner.) and therefore the desirability of the cluster may also be temporary. For example, the nodes can apply power to antennas in an array (or subarray) to result in transmitting signals and/or receiving signals in a certain direction, and the nodes typically determine a single directional beam having desirable signal properties. The nodes can then communicate using the single directional beam, while ignoring (or not capturing) energy from other weaker/sub-dominant clusters in the channel. In some implementations, the nodes may have at least one fallback/backup beam to which to switch in cases of blockage occurring on the current/ serving beam (e.g., blockage caused by movement of one or more objects in the channel environment or nodes, as described above).

Aspects described herein relate to providing multi-directional beam communications between nodes of a wireless network where one node can transmit, and/or the other node can receive, concurrently over multi-directional beams. In one example, a node can report capability information to the other node, where the capability information can indicate whether the node can (and how to) participate in the determination of multi-directional beams for multi-directional beam communications. In another example, the capability information can include one or more parameters related to multi-directional beam communications, such as a number of antenna elements in an active antenna array (or subarray), a request for a number of reference signals (RSs) from which to derive beam weights, etc. The other node can determine a number of RSs to transmit based on the capability information and multi-directional beam communications can be established based on the capability information and/or the RSs, as described further herein.

Multi-directional beam communications can include communications that are based on a single set of beam weights that lead to a beam pattern having multiple directions, multiple concurrent beams each having multiple directions, etc. In one example, the node can form the antenna resources such as phase shifter and amplitude control combinations to generate the single set of beam weights having multiple directional support, which can relate to the single beam having multiple peaks in different directions, where a peak can refer to a spatial direction of the signal having a threshold signal strength or quality. In another example, the node can form the antenna resources to concurrently generate multiple sets of beam weights each having a single peak in a certain spatial direction. As used herein, the terms "multi-directional beam," "multi-beam," or "multiple beams" are intended to refer to either form of multi-direction beam communications described above or substantially any scenario where antenna resources can be beamformed to generate a set or sets of beam weights having more than one peak or spatial direction. For example, the beam weights of a multi-beam can either result in multiple identifiable or distinguishable peaks in the beam pattern space, or result in a beam pattern with a coverage area that is wider than the coverage area of a beam with progressive phase shifts where the coverage area of the multi-beam is defined as the area in beamspace within a threshold condition of the peak array gain In the examples described herein, multi-directional beam communications can improve throughput and/or reliability of communications between the nodes. In some examples, one node can be a user equipment (UE) and the other node can be a base station (e.g., gNB), or both nodes can be UEs, etc. in 5G NR or other wireless communication technologies. Other scenarios where the proposed invention could be helpful include nodes made of customer premises equipment (CPE), repeaters (smart or simple/dumb), relay or side link nodes, transmission reception points (TRPs), etc.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for performing multi-beam communications, which may be based on indicating a capability for the multi-beam communications. In addition, some nodes may have a modem 340 and configuring component 342 for configuring a node to perform multi-beam communications, which may include transmitting multiple RSs to the node for establishing antenna weights, as described herein. Though a UE 104 is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104 can indicate (e.g., via transmission to a base station 102) a capability for performing multi-beam communications, which can include an indication of the capability, a number of antenna elements in an active antenna array (or subarray) of the UE 104, a requested number of RSs, etc. Configuring component 342 of base station 102 can determine a number of RSs to transmit to a UE 104, which can be based on a received capability, and can transmit the RSs to the UE 104. Communicating component 242 can receive the RSs and can use the RSs to estimate antenna weights for beamforming communications to be transmitted to, or received from, the base station 102 using multi-beam communications.

Figure 2:
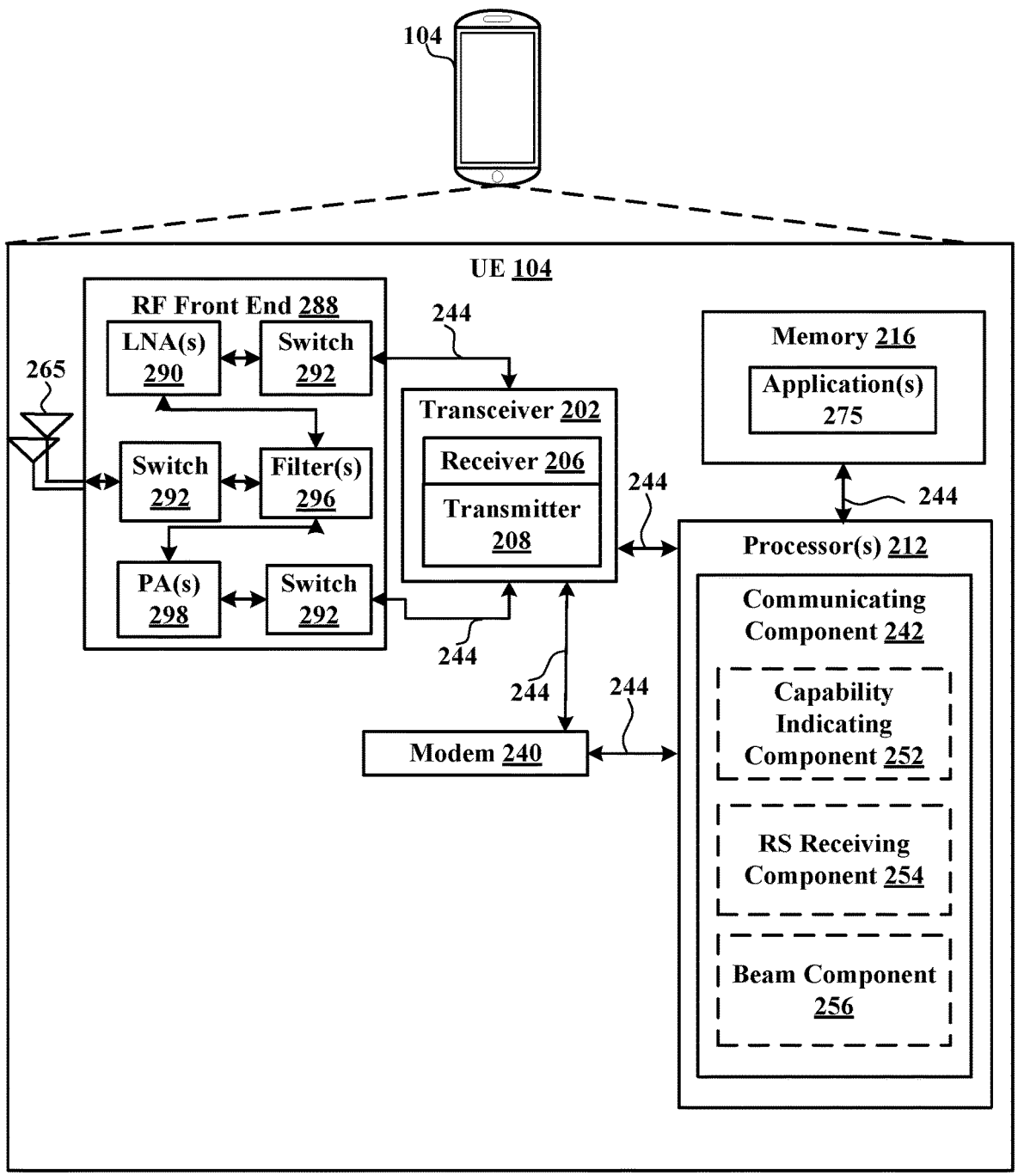
FIG. 2 is a block diagram illustrating an example of a UE, in accordance with various aspects of the present disclosure.
Figure 3:
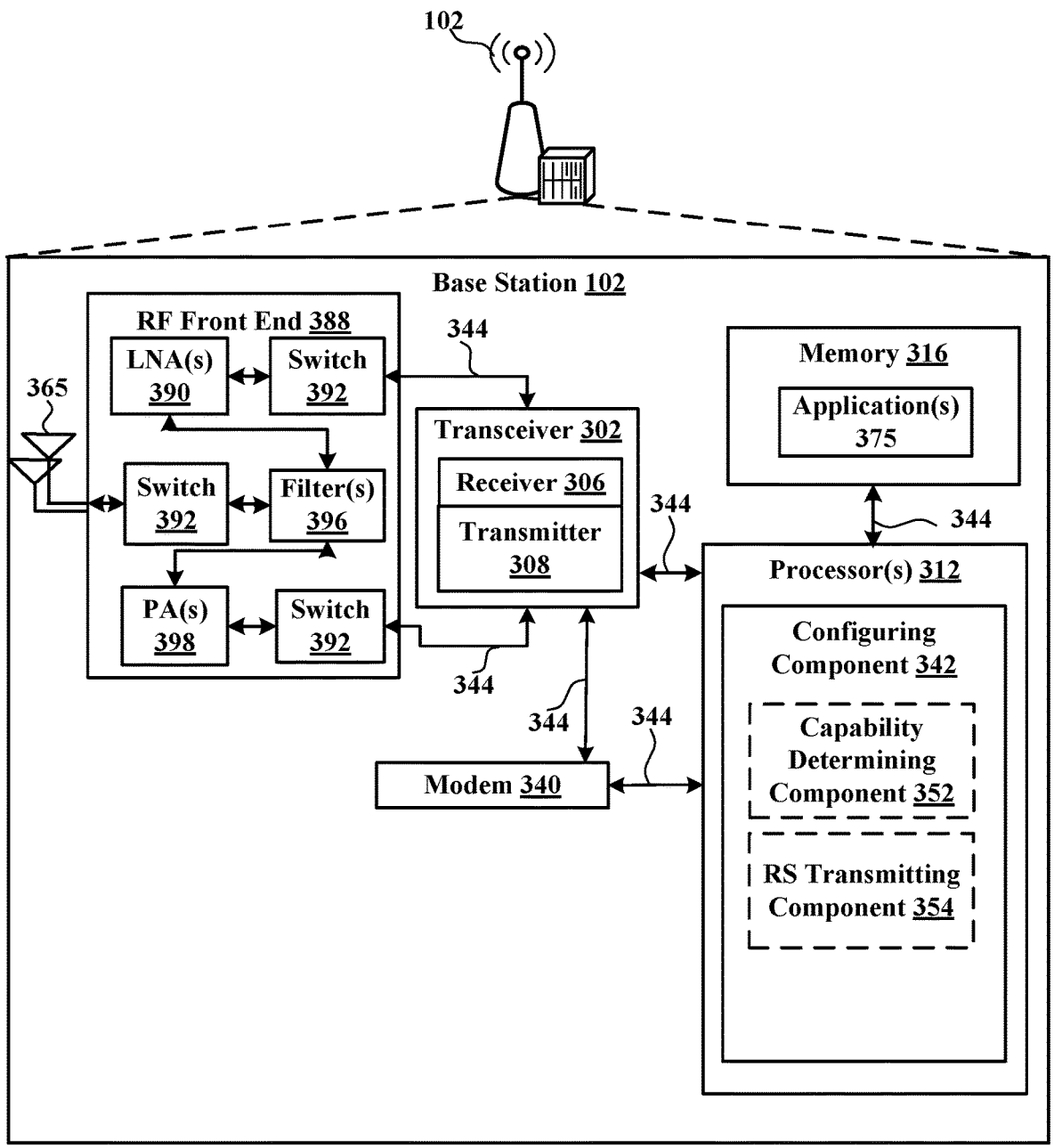
FIG. 3 is a block diagram illustrating an example of a base station, in accordance with various aspects of the present disclosure.
Figure 4:
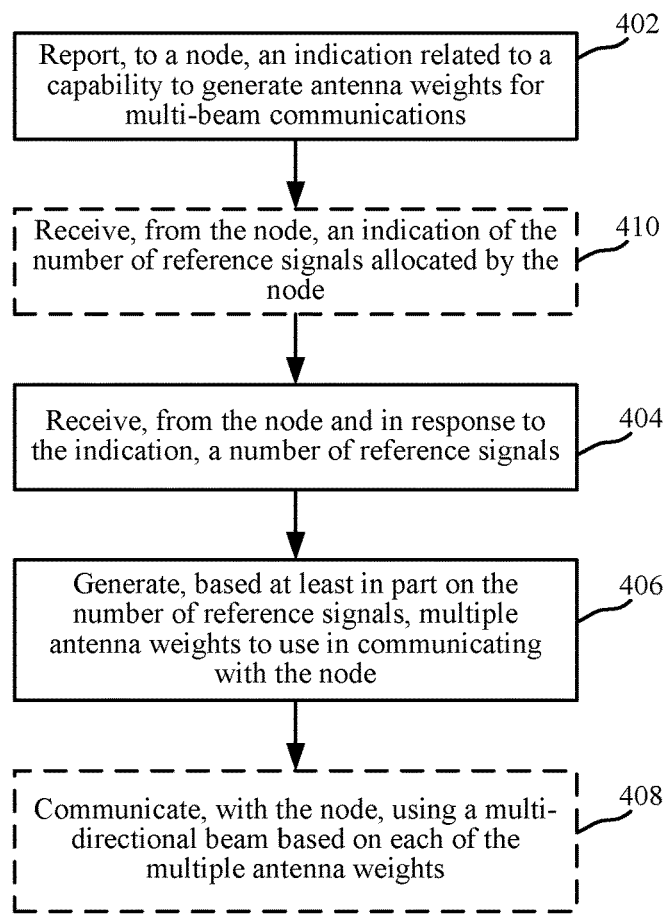
FIG. 4 is a flow chart illustrating an example of a method for generating a multi-directional beam for wireless communications, in accordance with various aspects of the present disclosure.
Figure 5:
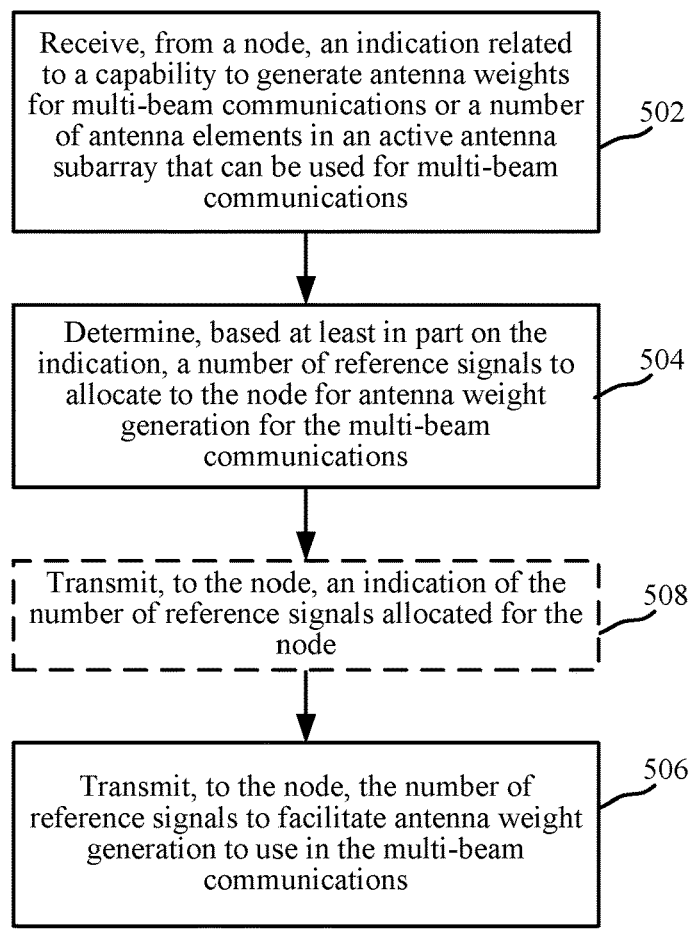
FIG. 5 is a flow chart illustrating an example of a method for configuring reference signals for transmitting to a node, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing multi-beam communications. For example, the multi-beam communications may be based on indicating a capability for the multi-beam communications, as described herein. In addition, UE 104 can include a UE device, or may include UE functionality of other devices, such as other customer premises equipment (CPE), a relay, a repeater, etc.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), signal-to-interference-and-noise ratio (SINR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a capability indicating component 252 for indicating a capability regarding multi-beam communications, a RS receiving component 254 for receiving multiple RSs from a node for estimating antenna weights for generating beams, and/or a beam component 256 for generating a multi-directional beam for communicating with the node, as described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a node to perform multi-beam communications. For example, the multi-beam communications may include transmitting multiple RSs to the node for establishing antenna weights, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a capability determining component 352 for determining a capability of a node for multi-beam communications, and/or a RS transmitting component 354 for transmitting multiple RSs to the node for estimating antenna weights to generate the multi-beams in concurrently communicating with the node, as described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for performing multi-beam communications. FIG. 5 illustrates a flow chart of an example of a method 500 for configuring a node for performing multi-beam communications. Methods 400 and 500 are described in conjunction with one another for ease of explanation, though the methods 400 and 500 are not required to be performed in conjunction. In an example, a UE (e.g., UE 104) can perform the functions described in method 400 using one or more of the components described in FIGS. 1 and 2. UE 104 can include a UE device, or may include UE functionality of other devices, such as other CPE, a relay, a repeater, etc. In another example, a base station 102, another UE (e.g., in D2D or side link communications with UE 104), or the like, can perform the functions described in method 500 using one or more of the components described in FIGS. 1 and 3.

In method 400, at Block 402, an indication related to a capability to generate antenna weights for multi-beam communications can be reported to a node. In an aspect, capability indicating component 252, e.g., in conjunction with processor(s) 212, memory 216, transceiver 202, communicating component 242, etc., can report, to a node (e.g., base station 102), the indication related to the capability (e.g., of the UE 104) to generate antenna weights for multi-beam communications. For example, the capability can relate to a capability for communicating using a multi-beam. In an example, a multi-beam can refer to a beam having multiple spatial directions or peaks or multiple beams used concurrently in communications (e.g., in transmitting or receiving communications), as described, such that the node indicating the capability may support beamforming antenna resources to create a multi-directional beam or beams. For example, in using a multi-beam, a node can beamform antenna resources such as amplitude control and phase shifter combinations to generate a multi-directional beam to capture energy from multiple clusters. In an example, each beam or peak in the multi-directional beam may use different antenna resources (e.g., different sets of one or more antenna elements or subarrays) to create the multi-directional beam, or may use some of the same antenna resources, which can be beamformed to achieve the multi-directional beam.

For example, capability indicating component 252 can transmit the indication of the capability to the node (e.g., the base station), which may be based on a request received from the node for the capability information. In addition, for example, capability indicating component 252 can transmit the indication in radio resource control (RRC) layer signals or other signals to indicate the capability to the other node. In one example, capability indicating component 252 may transmit the capability indication as part of a random access procedure or other signaling procedure with the other node. Additionally, for example, capability indicating component 252 can transmit the indication as static or semi-static signaling that is transmitted when establishing communications with the base station 102 or otherwise based on an initial and/or periodic request from the base station. In another example, capability indicating component 252 can transmit the indication as dynamic signaling, which may be based on detecting one or more triggers or events at the UE 104, such as a function of a state of the UE (e.g., idle or inactive state, connected or active state, etc.), performance tradeoffs determined for using multi-beam communications (e.g., power used to receive associated reference signal versus power saved by additional throughput using multi-beams, etc.).

In an example, capability indicating component 252 can report the indication dynamically based on determining performance tradeoffs. For example, capability indicating component 252 can report the indication dynamically based on a multi-beam weight processing power at the UE 104, which can include determining processing resources the UE 104 has available to dedicate to estimating antenna weights for multi-beam communications (e.g., as a total quantity of processing resources, a quantity of processing resources not being utilized, a class of processor or other hardware, a memory capacity, a buffer status, etc.). For example, where the processing resources decrease or increase respective to a threshold, capability indicating component 252 can report an updated indication of capability for multi-beam communications to the base station 102. In another example, capability indicating component 252 can report the indication dynamically based on power needed to persistently power radio resources at the UE 104. For example, where the power needed decreases or increases respective to a threshold (or an available power, battery level, etc. at the UE 104 decreases or increases respective to a threshold and/or respective to the power needed to power the radio resources), capability indicating component 252 can report an updated indication of capability for multi-beam communications to the base station 102. In another example, capability indicating component 252 can report the indication dynamically based on determining one or more operating parameters of the UE 104 and/or comparing the one or more operating parameters to one or more thresholds. For example, the one or more operating parameters may include thermal considerations and/or measurements at the UE 104, beamforming architecture, bus latencies, memory overheads, performance improvement metrics (e.g., of SNR), etc. with respect to corresponding thresholds. In an example, capability indicating component 252 may update indications where values of the parameters achieve or fall below thresholds, etc.

For example, the capability information may include one or more parameters based on which a number of RSs to transmit to the UE 104 for determining a multi-directional beam to use in multi-beam communications can be determined. For example, the one or more parameters may include an indication of a capability for generating multi-beam antenna weights, an indication of a number of active antenna elements in an array, or subarray, of the UE 104, a number of RSs requested from the node (e.g., the base station 102), and/or the like. In one example, the UE 104 can include multiple antenna subarrays positioned around the UE 104 to provide diversity for communicating using antenna elements. For example, where one or more subarrays are blocked or are experiencing lower signal power or quality measurements, another subarray can be used for communications. Each subarray can have a number of antenna elements, and thus indicating the capability can include indicating a number of antenna elements in one or more active antenna subarrays. This indication of the number of antenna elements can imply capabilities for multi-beam communications using the antenna elements in the one or more active antenna subarrays.

In an example, the capability indication can include an indication of whether the UE 104 supports one of phase estimation or signal strength, quality, and/or amplitude only estimation in estimating antenna weight for beamforming communications. For example, supporting phase estimation can refer to a capability of the UE 104 to estimate the phase and amplitude of a beam-based signal, which may use more resources than estimating signal strength/quality. For example, supporting signal strength, quality, and/or amplitude only estimation can refer to a capability of the UE 104 to estimate RSRP, SINR, or other strength, quality, or amplitude measurements based on second order statistics (e.g., no phase information). In an example, the capability may be determined based on other parameters of the UE 104, such as available processing power or other resources, a type or class of the UE 104 or its corresponding antenna/radio resources, etc. In an example, a capability to support phase estimation can be more desirable in general, but may have some tradeoffs. For example, phase estimation may allow quicker channel estimation (e.g., based on a fewer number of RSs) than a signal strength, quality, or amplitude based estimation. For example, phase estimation can be based on processing of I/Q samples at radio frequency (RF) port, intermediate frequency (IF) port, local oscillator (LO), etc. depending on beamforming architecture, which can lead to higher storage overhead, software/firmware overheads, bus latencies, higher power consumption for processing, higher thermal, etc. Signal strength, quality, or amplitude based estimation can be currently supported in some wireless communication technologies can be of lesser complexity, processing power, and leading to lower thermal overheads. Since signal strength, quality, or amplitude based estimation may use more RSs, it can lead to better performance than phase based estimation at the cost of increased device power for keeping radio resource activated. In any case, the capability information of whether phase estimation or signal strength, quality, or amplitude only estimation is supported can be used to determine a number of RSs to configure for the UE 104.

In an example, different types or classes of UEs can have different capabilities (e.g., and the indication of capability can be or can include the type or class of the UE in one example). For instance, low, middle, or high tier devices may not have phase based estimation capabilities at all, whereas premium tier devices may have the capability. In addition, for example, for premium tier devices, the capability may depend on device state, use-case, conditions, etc., and the device can switch back and forth between phase based estimation capability and signal strength, quality, or amplitude based estimation capability (e.g., and the base station 102/gNB can be transparent to such switching or the UE 104 can notify the base station 102/gNB of the switching via the capability indication, etc.).

In method 500, at Block 502, an indication related to a capability to generate antenna weights for multi-beam communications or a number of antenna elements in an active antenna subarray that can be used for multi-beam communications can be received from a node. In an aspect, capability determining component 352, e.g., in conjunction with processor(s) 312, memory 316, transceiver 302, configuring component 342, etc., can receive, from the node (e.g., UE 104), the indication related to the capability to generate antenna weights for the multi-beam communications or a number of antenna elements in an active antenna subarray that can be used for multi-beam communications. For example, capability determining component 352 can receive the indication from the node (e.g., UE 104) in RRC signaling or other signaling (e.g., as part of a random access procedure or other procedure), etc. Furthermore, as described in an example, capability determining component 352 can receive the indication in static, semi-static, and/or dynamic signaling from the UE 104, as described above. In addition, as described, the indication can include capability information related to generating multi-beam antenna weights (e.g., which may include an indication of whether phase estimation or signal strength, quality, or amplitude only estimation is supported), an indication of a number of antenna elements in one or more active antenna subarrays, a number of RSs requested by the UE 104, etc.

In method 500, at Block 504, a number of RSs to allocate to the node for antenna weight generation for the multi-beam communication can be determined. In an aspect, RS transmitting component 354, e.g., in conjunction with processor(s) 312, memory 316, transceiver 302, configuring component 342, etc., can determine, based at least in part on the indication, the number of RSs to allocate to the node (e.g., the UE 104) for antenna weight generation for the multi-beam communications. For example, RS transmitting component 354 can determine to allocate a different number of RSs based on the capability indication of whether the UE 104 supports phase estimation and/or signal strength, quality, or amplitude only estimation (e.g., RSRP/SINR-only estimation) of antenna weights, where this information is included in the capability indication received at Block 502. For example, RS transmitting component 354 may determine to allocate a less number of RSs for phase estimation capability than for strength, quality, or amplitude only estimation. In another example, RS transmitting component 354 can determine to allocate a different number of RSs based on the capability indication of the number of antenna elements in one or more active antenna subarrays at the UE 104, as described above (e.g., a higher number of antenna elements can be accorded more RSs than a lower number). In yet another example, RS transmitting component 354 can determine to allocate a different number of RSs based on the capability indication of a requested number of RSs. For example, RS transmitting component 354 can fulfill the requested number of RSs, or may limit the number of RSs using the requested RS information (e.g., based additionally on network level considerations), etc.

In addition, for example, RS transmitting component 354 can determine the number of RSs as contiguous or non-contiguous RSs (e.g., contiguous or non-contiguous in time, such as contiguous or non-contiguous OFDM symbols, contiguous or non-contiguous transmission opportunities for the signals, where the transmission opportunities may span symbols, etc.). In one example, considering a 4-by-1 antenna array at a device, an RS structure for making a multi-beam estimate using phase based estimation may use four RSs, which can be transmitted at four different contiguous or non-contiguous time instances (e.g., an OFDM symbol or other unit of time). Thus, in an example, RS transmitting component 354 can determine the number of RSs based on (e.g., or to be equal to) the number of antennas in one or more active subarrays at the UE 104 where the UE 104 indicates phase estimation capability. For signal strength, quality, and/or amplitude based estimation, more than four RSs can be used for 4-by-1 array (e.g., 10 RSs). The determination of the number of RSs for a certain size antenna array can be based on a specific formula. In any case, for example, RS transmitting component 354 can determine the number of RSs based on the specific formula as a function the number of antennas in one or more active subarrays at the UE 104 where the UE 104 indicates signal strength, quality, or amplitude estimation capability.

In method 500, at Block 506, the number of RSs can be transmitted to the node to facilitate antenna weight generation to use in the multi-beam communications. In an aspect, RS transmitting component 354, e.g., in conjunction with processor(s) 312, memory 316, transceiver 302, configuring component 342, etc., can transmit, to the node (e.g., UE 104), the number of RSs to facilitate antenna weight generation to use in the multi-beam communications. For example, RS transmitting component 354 can transmit the number of RSs, which may be contiguous or non-contiguous (e.g., in time, in RS transmission opportunities, etc.). In an example, RS transmitting component 354 can transmit the number of RSs as different beams having different directionality, which can be used by the node (e.g., UE 104) to determine which multi-directional beam or beams to use in concurrently transmitting wireless communications to, or concurrently receiving wireless communications from, the base station 102. For example, the number of RSs can be greater than a number of RSs that the node (e.g., UE 104) is capable of using for communications, such to allow the node to select beams that are based on a desirable subset of the RSs. For example, the RSs may include a certain type of RS suitable for beam detection/determination by the node (e.g., synchronization signal block (SSB), which can include a primary synchronization signal (PSS), secondary synchronization signal (SSS), etc., downlink channel state information reference signal (CSI-RS), and/or the like).

In addition, in an example, RS transmitting component 354 can determine to transmit the number of RSs based on a beamforming pattern, such as using wider beams first through narrower beams to allow a node (e.g., UE 104) to detect a desirable wider beam, and then one or more narrower beams of the wider beam that may be desirable at the node. RS transmitting component 354 can determine, based on the indication received from the node (e.g., at Block 502), the number of RSs to transmit as beams based on the beamforming pattern. For example, RS transmitting component 354 can transmit the number of RSs as beams based on a codebook specified at the base station 102 (e.g., hardcoded or otherwise configured in the base station 102 based on a wireless communication technology). RS transmitting component 354 can transmit multiple wider beams each having a direction and an angular spread over an area. For each wider beam, RS transmitting component 354 can transmit one or more narrower beams in one or more directions and more narrow angular spread within the angular spread covered by an associated wider beam. In any case, RS transmitting component 354 can determine the number of beams to transmit based on the received capability indication.

In method 400, at Block 404, a number of reference signals can be received from the node and in response to the indication. In an aspect, RS receiving component 254, e.g., in conjunction with processor(s) 212, memory 216, transceiver 202, communicating component 242, etc., can receive, from the node (e.g., base station 102) and in response to the indication (e.g., the indication reported in Block 402), the number of reference signals. As described, for example, RS receiving component 254 can receive, from the node (e.g., base station 102), the number of reference signals as contiguous or non-contiguous in time or in RS transmission opportunity. In addition, for example, RS receiving component 254 may receive the number of reference signals as including a wider beam and/or one or more associated narrower beams based on a codebook, etc. The RSs may be an indication of beams supported by the node (e.g., base station 102) for transmitting communications to, and/or receiving communications from, the UE 104, as part of multi-beam communications or otherwise, as described. In addition, for example, RS receiving component 254 can receive the number of reference signals using associated beams (e.g., by beamforming antenna resources differently for receiving each reference signal), which may include different receive beams for each of the reference signals based on the capability indication.

In method 400, at Block 406, multiple antenna weights, to use in communicating with the node, can be generated based at least in part on the number of RSs. In an aspect, beam component 256, e.g., in conjunction with processor(s) 212, memory 216, transceiver 202, communicating component 242, etc., can generate, based at least in part on the number of RSs, multiple antenna weights to use in communicating with the node (e.g., base station 102). For example, beam component 256 can determine which of the number of RSs have desirable signal properties, which may be based on phase estimation, signal strength, quality, or amplitude estimation, and/or the like, as described above (e.g., based on the indicated capability). In an example, beam component 256 can determine multiple ones of the number of RSs (e.g., two RSs or more) to use in generating beams to communicate with the node (e.g., base station 102), and can determine the antenna weights to generate the beams based on the number of RSs. For example, beam component 256 can compute the antenna weights based on determining a reciprocal property of the corresponding RSs. For example for a given RS, beam component 256 can generate a reciprocal beam for receiving communications from the node (e.g., base station 102) and/or transmitting communications to the node. For example, beam component 256 can determine a given reciprocal beam as steered in the direction from which the RS is received at Block 404. Generating a multi-directional beam in this regard can facilitate concurrent multi-beam communications where the UE 104 can transmit communications using the multi-directional beam or receive communications using the multi-directional beam, which may improve quality or throughput of the communications in general, provide a desirable backup beam when another beam is interfered or at least partially blocked, etc.

In this regard, in method 400, optionally at Block 408, the node can be communicated with using a multi-directional beam based on each of the multiple antenna weights. In an aspect, beam component 256, e.g., in conjunction with processor(s) 212, memory 216, transceiver 202, communicating component 242, etc., can communicate, with the node (e.g., base station 102), using the multi-directional beam based on each of the multiple antenna weights. For example, beam component 256 can transmit communications to the base station 102 by concurrently beamforming antennas in one or more active antenna arrays (or subarrays) using the multiple antenna weights generated at Block 406 to transmit concurrent beams or a beam having multiple directions to the base station 102. For example, the transmitted multi-directional beam may include reference signals, communications transmitted over an uplink control channel or uplink data channel, etc. In another example, beam component 256 can receive communications from the base station 102 by concurrently beamforming antennas in one or more active antenna arrays (or subarrays) using the multiple antenna weights generated at Block 406 to receive a multi-directional beam from the base station 102. For example, the received multi-directional beam may include reference signals, communications received over a downlink control channel or uplink data channel, etc.

In method 500, optionally at Block 508, an indication of the number of RSs allocated for the node can be transmitted to the node. In an aspect, configuring component 342, e.g., in conjunction with processor(s) 312, memory 316, transceiver 302, etc., can transmit, to the node (e.g., UE 104), the indication of the number of RSs allocated for the node. For example, configuring component 342 can indicate the number of RSs so the node (e.g., UE 104) knows how many RSs to expect from the base station 102. In another example, configuring component 342 can indicate other configuration information for receiving the RSs, such as symbols over which the RSs are transmitted, a pattern for transmitting the RSs (e.g., wider and then narrower RSs, as described above), a codebook used in determining the RSs for transmission, and/or the like. For example, configuring component 342 can transmit this information in RRC signaling, dedicated control signaling (e.g., downlink control information (DCI)), etc.

In method 400, optionally at Block 410, an indication of the number of RSs allocated by the node can be received from the node. In an aspect, communicating component 242, e.g., in conjunction with processor(s) 212, memory 216, transceiver 202, communicating component 242, etc., can receive, from the node (e.g., base station 102), the indication of the number of RSs allocated by the node. For example, communicating component 242 can receive the indication as a value representing an integer value of a count of the number of RSs the node is going to transmit to the UE 104. In addition, in an example, communicating component 242 can receive, from the node, other configuration information for receiving the RSs, such as symbols over which the RSs are transmitted, a pattern for transmitting the RSs (e.g., wider and then narrower RSs, as described above), a codebook used in determining the RSs for transmission, and/or the like. For example, communicating component 242 can receive this information in RRC signaling, dedicated control signaling (e.g., DCI), etc. from the node (e.g., base station 102). RS receiving component 254 can receive the number of reference signals (e.g., as described in reference to Block 404) based on the received indication of the number of RSs and/or other configuration information. In an example, RS receiving component 254 can use this information to determine the number of RSs to receive (e.g., at Block 404), resources over which to receive the RSs, etc.

Figure 6:
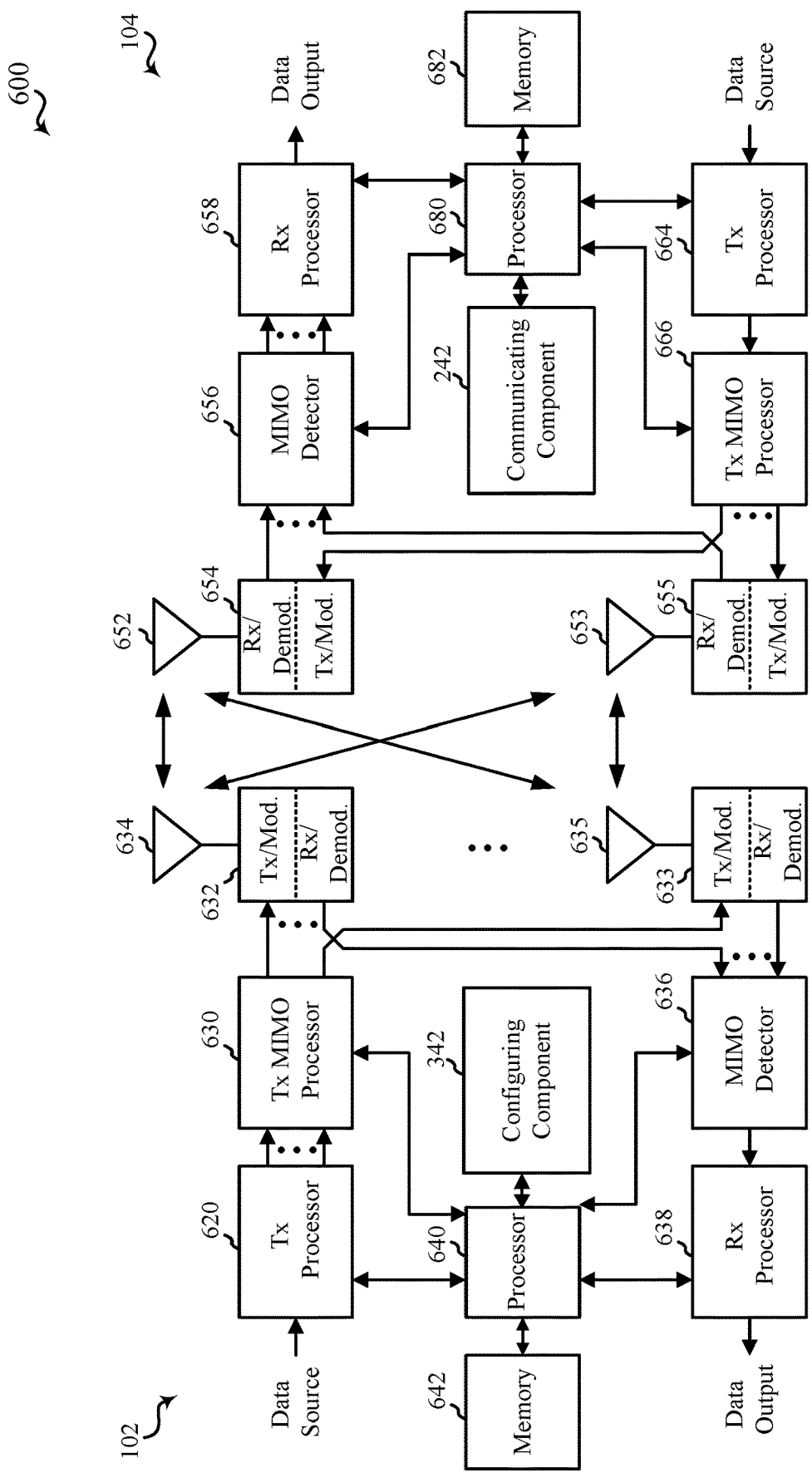
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including reporting, to a base station, an indication related to a capability to generate antenna weights for a multi-beam, receiving, from the base station in response to the indication, a number of reference signals, wherein the number of reference signals are contiguous or non-contiguous in time, and generating, based at least in part on the number of reference signals received from the base station, multiple antenna weights to use in communicating with the base station based on multiple concurrent beams.

In Aspect 2, the method of Aspect 1 includes wherein the capability includes a capability for estimating relative phases across antenna elements in generating the multiple antenna weights.

In Aspect 3, the method of any of Aspects 1 or 2 include wherein the capability includes a capability for estimating only a signal strength or amplitude or quality in generating the multiple antenna weights.

In Aspect 4, the method of any of Aspects 1 to 3 include wherein reporting the indication comprises a dynamic reporting based on a state or performance metrics.

In Aspect 5, the method of Aspect 4 includes wherein the performance metrics include at least one of a processing power for generating multiple beam weights, a power for operating a transceiver in the process of generating multiple beam weights, a thermal measurement, a beamforming architecture, a bus latency, memory overhead, or a performance improvement metric.

In aspect 6, the method of any of Aspects 1 to 5 include wherein reporting the indication comprises a static reporting, a semi-static reporting, or a dynamic reporting.

In Aspect 7, the method of any of Aspects 1 to 6 include wherein the indication includes a first indication of the capability to generate multiple antenna weights and a second indication of a number of antenna elements in an active antenna subarray.

In Aspect 8, the method of any of Aspects 1 to 7 include wherein the indication includes the number of reference signals requested from the base station.

In Aspect 9, the method of any of Aspects 1 to 8 include receiving, from the base station, an indication of the number of reference signals allocated by the base station.

In Aspect 10, the method of any of Aspects 1 to 9 include communicating with the base station using the multiple concurrent beams based on each of the multiple antenna weights.

Aspect 11 is a method for wireless communication including receiving, from a user equipment (UE), an indication related to at least one of a capability to generate antenna weights for a multi-beam or a number of antenna elements in an active antenna subarray, determining, based at least in part on the indication, a number of reference signals to allocate to the UE for antenna weight generation for multi-beam communications, wherein the number of reference signals are contiguous or non-contiguous in time, and transmitting, to the UE, the number of reference signals to facilitate antenna weight generation to use in multi-beam communications based on multiple concurrent beams.

In Aspect 12, the method of Aspect 11 includes wherein the capability includes a capability for using relative phase estimation across antenna elements in generating the multiple antenna weights, and wherein determining the number of reference signals comprises determining a lesser number of reference signals than for a capability for using only a signal strength or amplitude or quality estimation in generating the multiple antenna weights.

In Aspect 13, the method of any of Aspects 11 or 12 include wherein the capability includes a capability for using only a signal strength or amplitude or quality estimation in generating multiple antenna weights, and wherein determining the number of reference signals comprises determining a greater number of reference signals than for a capability for using phase estimation in generating the multiple antenna weights.

In Aspect 14, the method of any of Aspects 11 to 13 include wherein the indication includes a first indication of the capability to generate multiple antenna weights and a second indication of the number of antenna elements in the active antenna subarray.

In Aspect 15, the method of any of Aspects 11 to 14 include wherein the indication includes a requested number of reference signals requested by the UE, and wherein determining the number of reference signals is based at least in part on the requested number of reference signals.

In Aspect 16, the method of any of Aspects 11 to 15 include transmitting, to the UE, an indication of the number of reference signals.

Aspect 17 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 16.

Aspect 18 is an apparatus for wireless communication including means for performing the operations of one or more methods in any of Aspects 1 to 16.

Aspect 19 is a computer-readable medium including code executable by one or more processors to perform the operations of one or more methods in any of Aspects 1 to 16.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
reporting, to a base station, a first indication of a capability for estimating relative phases across antenna elements for generating multiple antenna weights for multi-beam communications and a second indication of a number of antenna elements in an active antenna subarray;
receiving, from the base station in response to at least the first indication, a number of reference signals, wherein the number of reference signals are contiguous or non-contiguous in time; and
generating, based at least in part on the number of reference signals received from the base station, multiple antenna weights to use in communicating with the base station wherein the multiple antenna weights generate a multi-beam.

2. The method of claim 1, wherein the capability includes a capability for estimating a signal strength or amplitude or quality in generating the multiple antenna weights.

3. The method of claim 1, wherein reporting at least the first indication comprises a dynamic reporting based on a state or one or more determined performance metrics.

4. The method of claim 3, wherein the one or more determined performance metrics include at least one of a processing power for generating the multiple antenna weights, a power for operating a transceiver in generating the multiple antenna weights, a thermal measurement, a beamforming architecture, a bus latency, a memory overhead, or a performance improvement metric.

5. The method of claim 1, wherein reporting at least one of the first or second indication comprises a static reporting, a semi-static reporting, or a dynamic reporting.

6. The method of claim 1, wherein the first indication includes the number of reference signals requested from the base station.

7. The method of claim 1, further comprising receiving, from the base station, an indication of the number of reference signals allocated by the base station.

8. The method of claim 1, further comprising communicating with the base station using the multi-beam generated from the multiple antenna weights.

9. A method for wireless communication, comprising:
receiving, from a user equipment (UE), an indication related to a capability for estimating relative phases across antenna elements for generating multiple antenna weights for multi-beam communications and a number of antenna elements in an active antenna subarray that can be used for the multi-beam communications;
determining, based at least in part on the indication, a number of reference signals to allocate to the UE for antenna weight generation for the multi-beam communications, wherein the number of reference signals are contiguous or non-contiguous in time; and
transmitting, to the UE, the number of reference signals to facilitate antenna weight generation to use in the multi-beam communications.

10. The method of claim 9, wherein determining the number of reference signals comprises determining a lesser number of reference signals for the first capability than for a second capability for using a signal strength or amplitude or quality estimation in generating the multiple antenna weights.

11. The method of claim 9, wherein the capability includes a first capability for using a signal strength or amplitude or quality estimation in generating multiple antenna weights, and wherein determining the number of reference signals comprises determining a greater number of reference signals for the first capability than for a second capability for using phase estimation in generating the multiple antenna weights.

12. The method of claim 9, wherein the indication includes a requested number of reference signals requested by the UE, and wherein determining the number of reference signals is based at least in part on the requested number of reference signals.

13. The method of claim 9, further comprising transmitting, to the UE, an indication of the number of reference signals.

14. An apparatus for wireless communication, comprising:
a transceiver;
a memory configured to store instructions; and
one or more processors communicatively coupled with the transceiver and the memory, wherein the one or more processors are configured to:
report, to a base station, a first indication of a capability for estimating relative phases across antenna elements for generating multiple antenna weights for multi-beam communications and a second indication of a number of antenna elements in an active antenna subarray;
receive, from the base station in response to at least the first indication, a number of reference signals, wherein the number of reference signals are contiguous or non-contiguous in time; and generate, based at least in part on the number of reference signals received from the base station, multiple antenna weights to use in communicating with the base station wherein the multiple antenna weights generate a multi-beam.

15. The apparatus of claim 14, wherein the capability includes a capability for estimating a signal strength or amplitude or quality in generating the multiple antenna weights.

16. The apparatus of claim 14, wherein the one or more processors are configured to report at least the first indication as a dynamic reporting based on a state or one or more determined performance metrics.

17. The apparatus of claim 16, wherein the one or more determined performance metrics include at least one of a processing power for generating the multiple antenna weights, a power for operating a transceiver in generating the multiple antenna weights, a thermal measurement, a beamforming architecture, a bus latency, a memory overhead, or a performance improvement metric.

18. The apparatus of claim 14, wherein the one or more processors are configured to report at least one of the first or second indication as a static reporting, a semi-static reporting, or a dynamic reporting.

19. The apparatus of claim 14, wherein the first indication includes the number of reference signals requested from the base station.

20. The apparatus of claim 14, wherein the one or more processors are further configured to receive, from the base station, an indication of the number of reference signals allocated by the base station.

21. The apparatus of claim 14, wherein the one or more processors are further configured to communicate with the base station using the multi-beam generated from the multiple antenna weights.

22. An apparatus for wireless communication, comprising:
   a transceiver;
   a memory configured to store instructions; and
   one or more processors communicatively coupled with the transceiver and the memory, wherein the one or more processors are configured to:

receive, from a user equipment (UE), an indication related to a capability for estimating relative phases across antenna elements for generating multiple antenna weights for multi-beam communications and a number of antenna elements in an active antenna subarray that can be used for the multi-beam communications;

determine, based at least in part on the indication, a number of reference signals to allocate to the UE for antenna weight generation for the multi-beam communications, wherein the number of reference signals are contiguous or non-contiguous in time; and transmit, to the UE, the number of reference signals to facilitate antenna weight generation to use in the multi-beam communications.

23. The apparatus of claim 22, wherein the one or more processors are configured to determine the number of reference signals as a lesser number of reference signals for the first capability than for a second capability for using a signal strength or amplitude or quality estimation in generating the multiple antenna weights.

24. The apparatus of claim 22, wherein the capability includes a first capability for using a signal strength or amplitude or quality estimation in generating multiple antenna weights, and wherein the one or more processors are configured to determine the number of reference signals as a greater number of reference signals for the first capability than for a second capability for using phase estimation in generating the multiple antenna weights.

25. The apparatus of claim 22, wherein the indication includes a requested number of reference signals requested by the UE, and wherein the one or more processors are configured to determine the number of reference signals based at least in part on the requested number of reference signals.

26. The apparatus of claim 22, the one or more processors are further configured to transmit, to the UE, an indication of the number of reference signals.

* * * * *